Figure 1:
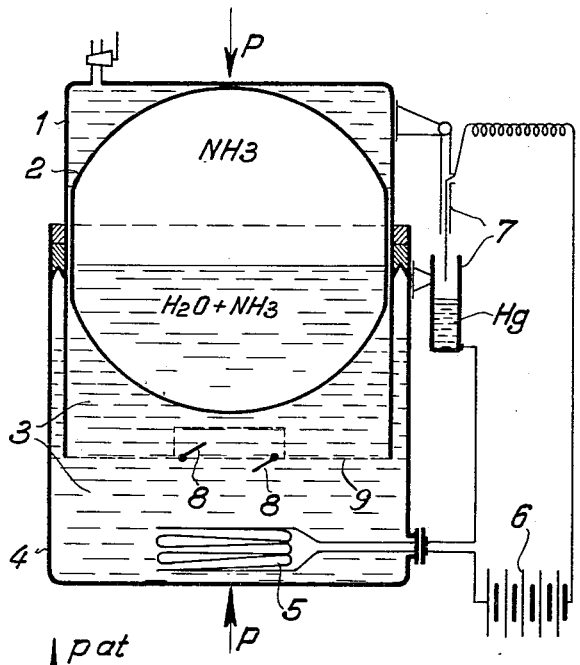

Sept. 10, 1957  G. A. GAEBLER  2,805,854
SPRING SYSTEMS
Filed July 3, 1953

Inventor:
Gustav Adolph Gaebler
by his attorney
John F.␣␣␣␣␣

United States Patent Office 2,805,854
Patented Sept. 10, 1957

2,805,854

SPRING SYSTEMS

Gustav Adolph Gaebler, Offenbach (Main), Germany

Application July 3, 1953, Serial No. 366,042

Claims priority, application Germany July 4, 1952

8 Claims. (Cl. 267—64)

This invention relates to variation of the operation of a spring, or the like, particularly a gas cushion, by thermal and other means.

Spring systems of various constructions are known in which the useful load placed upon a vehicle is taken up by means of adjusting devices, or also automatically by supporting springs (through progressive spring characteristics) or by a change of the spring preliminary tension, etc., so that, with a small weight of the vehicle and a large useful load, the spring suspensions adapt themselves to the total weight without being stressed excessively.

Recently spring systems which operate with air or gases have become of increased importance. Spring systems have been developed in which variable loads can be accommodated by a change of the gas filling or a decrease of the gas volume.

In accordance with the present invention, the pressure or volume of resilient material in a spring or like system, is varied by means of a temperature change. In the case of a cushion of confined gas, for example, the temperature increase can be obtained in a most simple manner with the aid of electrical heat elements of the type of hot plates or immersion heaters, and the connecting and disconnecting of the heating device can be made dependent on the deflection under load of the gas cushion device. A hollow chamber is closed off with air or gas under predetermined pressure inside. The interior hollow space can be arranged for the reception of the spring gas volume in various ways, such as by means of membranes or gas bubbles of synthetic materials which are very strong, and it is provided with an electrical heating device. When the vehicle is loaded, the air spring suspension or the gas spring system becomes correspondingly more dense, and the heating device is thereby automatically operated to heat the gas cushion until it has the desired volume under the applied load. A pressure-operated switch then cuts off the heating curent until by natural cooling of the system the gas pressure falls so far that the spring suspension becomes too soft and must again be heated.

The setting of the connecting and disconnecting pressures is made during the standstill of the vehicle automatically by short time pneumatically or electrically-actuated releasing of the load dependent adjusting device which is normally locked in operation.

Another means of automatic control of the spring suspension in operation is the use of a time-switch operated by a predetermined maximum deflection so that upon a spring depression beyond a certain amount the time-switch is turned on for a definite time, e. g., between 10 and 60 seconds, to connect the heating current and thus heat the gas cushion to restore its volume under the applied load. In that way the switch operates every time there is excessive deflection to oppose such deflection by heating the gas cushion.

Such automatic control of a gas spring suspension requires relatively small heat output, which can be decreased by appropriate insulation of the spring system, and yet regulates the spring action over a wide range, as illustrated by the following calculation:

A spring system of 20 centimeter diameter and 30 centimeter total height with 5 atmospheres normal pressure has a gas volume of 50 liters. It is known that the pressures of perfect gases behave in inverse ratio to their temperatures, thus $$\frac{P^1}{P^2} \text{ equals } \frac{T^1}{T^2}$$

For example, when $P^1$ is 5 atmospheres, $T^1$ is 300° C. (27 plus 273° C.), and $T^2$ is 350° C. (77 plus 273° C.), then $P^2$ is 6 atmospheres (5×350/300). It is therefore apparent that with air, for example, a 50° C. temperature increase of the gas cushion brings about a pressure increase of about 20% with the same volume, which means that the same volume of air will support a 20% greater load. A temperature increase of about 100° C. enables the same volume of air to support, roughly speaking, a 40% greater load, a value which normally will be quite sufficient in practice to equalize a large useful load difference. The percentage increase of the supporting capacity of gas cushions is thus only dependent upon the temperature ratio and is independent of the initial pressure on the cushion before the gas temperature is varied.

The quantities of heat necessary for the heating, and therefore the amount of energy required, are small, as the following calculation shows:

The specific heat, for example, for air between zero and 100° C. is 0.24 kilocalories/kg.° C. The specific weight of air in the normal state is 1.29 kg./m.³. Again assuming the above-mentioned 50 liter air content of the air cushion and 5 atmospheres initial pressure, the amount of heat required for 50° C. temperature increase is 0.05×50×0.24×1.29, which equals 0.8 kilocalories. Since a kilowatt hour of energy corresponds to 860 kilocalories, the energy calculated to be necessary to heat an air cushion of the above-mentioned size for a 20% increase of its supporting capacity is only 1/1000 kilowatt hour, an output which any electrical auxiliary installation of modern vehicles is able to put out easily even during operation.

It is also obviously possible to use the linear expansion of solid bodies or the volume expansion of fluid upon heating in order to change the preliminary tension of spring systems by heating.

The invention further provides for modifying the range of operating characteristics of a gas cushion by use of a body of fluid in contact with the gas cushion, utilizing a fluid having a capacity for absorbing the gas to an extent which varies with different pressures and temperatures. In this way the thermally variable range of gas cushion operating characteristics can be increased to accommodate an especially wide range of applied loads. This is particularly useful, for example, in the case of vehicles having a high ratio of useful load capacity relative to vehicle weight.

It is known that the dissolving capacity of gases in fluids, for example water, is very great. To these gases belong especially the hydrogen combinations of the halogens (for example, hydrogen iodide, hydrogen bromide, etc.). Particularly great is the absorption capacity of water for ammonia. Other fluids besides water can be used as a solution medium for gases, provided only that they do not chemically attack the enveloping means for the working gas to be used.

Figure 2:
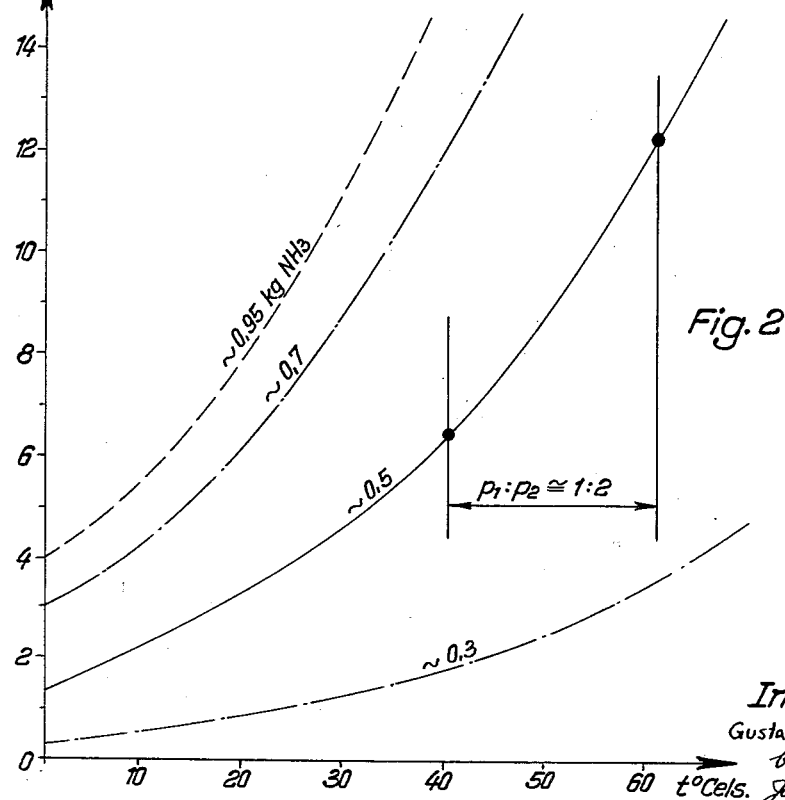

Other objects, advantages and details of the invention will become apparent from the following detailed description of a present preferred embodiment of the invention illustrated diagrammatically in the accompanying drawing. In the drawing:

Figure 1 is a diagrammatic vertical sectional view of spring cushion apparatus; and Figure 2 is a graph showing pressure in atmospheres plotted against temperature in degrees centigrade for the gas cushion shown in Figure 1.

Referring now more particularly to the drawing, there is provided a spring member 1 in the form of the upper half of a capsule-like metal container. A plastic bubble 2 (one or more may be used) is filled with a predetermined amount of water and ammonia, which has different solution and therefore gas characteristics at different temperatures and pressures. The gas present in the bubble 2 at any given time supplies the spring action of the assembly. A pressure transmitting fluid 3, such as oil or silicones, surrounds the bubble. A second spring member 4 in the form of the lower half of the metal container cooperates with the member 1 to retain the bubble 2 and fluid 3. A seal secured to the inner peripheral edge of member 4 and slidable around the outside of member 1 prevents escape of fluid 3, when varying opposed load pressures P cause relative movement of spring members 1 and 4.

The spring action is not limited to simple expansion and contraction of the working gas in bubble 2, in the illustrated example, but is modified by absorption of the working gas by the liquid in the bubble, depending on the pressure and temperature conditions. The process of absorption and evaporation involves a taking up and release of heat, and that has a thermal influence on the spring effects tending to give a soft spring action. Instead of using gases for the spring cushion, one can also use vapors. The vapor forming fluids should have favorable boiling point curves at various pressures and have a small evaporation heat.

One main advantage of such a system lies in the fact that relatively small temperature differences are sufficient to vary to a quite unusual extent the carrying capacity of such spring systems by varying the absorption or evaporation of the gas used as a spring cushion.

Figure 2 shows a diagram with lines of approximately the same absorption capacity of water for ammonia. Lines are drawn for 0.95, 0.70, 0.50, and 0.30 kilograms $NH_3$ in one kilogram of solution with varying pressures and temperatures. For the purpose of illustration, the line with 0.5 kilogram $NH_3$ in one kilogram of solution is taken as an example. Assuming that approximately the same amount of gas (kilogram) should always be present as working gas, and that the solution ratio should not be changed, one sees that on the line for 0.5 with a temperature of 40° C., a pressure of approximately six atmospheres takes place, while with 60° C. (only 20° C. more) a pressure of twelve atmospheres is required to retain the excess gas in solution. It is thus possible to obtain with very small temperature differences very extended adaptation of the spring systems to varying loads, such as in the case of vehicles with a wide range of useful loads relative to empty weight.

The adjustment of such a spring system is unusually simple. For instance, an electrical immersion heater 5 of small output is disposed in the pressure transmitting fluid 3 and is fed by a current source 6. The heat current is closed depending upon the desired spring play or deflection of the spring, by a simple immersion or vacuum switch. As shown diagrammatically in Figure 1, a mercury immersion switch 7 turns on the heating current as soon as the spring is depressed to a point where the contact pin dips into the mercury, and cuts it off again when the contact pin rises out of the mercury.

Such spring systems are useful as pure addition springs for ordinary spring systems in order to take up high useful loads without restricting the normal spring play.

Damping valves 8 are optionally mounted in a partition 9 separating the fluid 3 in member 1 from the fluid 3 in member 4, in order to further modify the spring action of the gas bubble 2.

The filling and setting of the spring bubble 2 is facilitated by taking advantage of the special dissolving properties of water for ammonia at low temperatures, at which the filling pressures are very small. The spring systems are prepared at these temperatures, and subsequently, upon heating to room temperature, the correct predetermined spring pressure develops automatically.

While I have illustrated and described a present preferred embodiment and method of practicing the invention, it will be recognized that it may be otherwise variously embodied and practiced within the scope of the following claims.

I claim:

1. A vehicle suspension system, comprising means forming a closed, sealed space having a variable range of volume, a pair of members between which varrying loads are to be transmitted, said members being relatively movable to vary the volume of said space-forming means, a cushion of gaseous material confined in said space, apparatus of variable temperature mounted adjacent said cushion to exchange heat therewith, means to vary the temperature of said apparatus, and means responsive to predetermined relative movement of said members to cause said apparatus to vary the temperature of the gaseous cushion, and thereby to cause a change in the resilient resistance of the gaseous cushion under load.

2. A vehicle suspension system, comprising means forming a closed, sealed space having a variable range of volume, a pair of members between which variable loads are to be transmitted, said members being relatively movable to vary the volume of said space-forming means, a cushion confined in said space and comprising both a liquid and a fluid of lower boiling point than the liquid, said fluid and liquid being unseparated and said fluid being soluble in the liquid to an extent varying substantially with relatively small changes of temperature of the liquid, apparatus of variable temperature mounted adjacent said cushion to exchange heat therewith, means to vary the temperature of said apparatus, and means responsive to predetermined relative movement of said members to cause said apparatus to vary the temperature of the cushion, and thereby to cause a change in the resilient resistance of the cushion under load.

3. A vehicle suspension system, comprising means forming a closed, sealed space having a variable range of volume, a pair of members between which variable loads are to be transmitted, said members being relatively movable to vary the volume of said space-forming means, a cushion confined in said space and comprising water and a volatile halogen compound soluble in the water, apparatus of variable temperature mounted adjacent said cushion to exchange heat therewith, means to vary the temperature of said apparatus, and means responsive to predetermined relative movement of said members to cause said apparatus to vary the temperature of the cushion, and thereby to cause a change in the resilient resistance of the cushion under load.

4. A vehicle suspension system, comprising means forming a closed, sealed space having a variable range of volume, a pair of members between which variable loads are to be transmitted, said members being relatively movable to vary the volume of said space-forming means, a cushion confined in said space and comprising water and ammonia, apparatus of variable temperature mounted adjacent said cushion to exchange heat therewith, means to vary the temperature of said apparatus, and means responsive to predetermined relative movement of said members to cause said apparatus to vary the temperature of the cushion, and thereby to cause a change in the resilient resistance of the cushion under load.

5. A vehicle suspension system, comprising means forming a closed, sealed space having a variable range of volume, a pair of members between which variable loads are to be transmitted, said members being relatively movable to vary the volume of said space-forming means, a cushion of gaseous material confined in said space, said space-forming means comprising a flexible bag which encloses the gaseous cushion to prevent its escape where said members are relatively movable, and also comprising a body of liquid surrounding the bag and separated by the bag from the gaseous cushion, apparatus of variable temperature mounted adjacent said cushion to exchange heat therewith, means to vary the temperature of said apparatus, and means responsive to predetermined relative movement of said members to cause said apparatus to vary the temperature of the gaseous cushion, and thereby to cause a change in the resilient resistance of the gaseous cushion under load.

6. A vehicle suspension system, comprising means forming a closed, sealed space having a variable range of volume, a pair of members between which variable loads are to be transmitted, said members being relatively movable to vary the volume of said space-forming means, a cushion of gaseous material confined in said space, said space-forming means comprising a flexible bag which encloses the gaseous cushion to prevent its escape where said members are relatively movable, and also comprising a body of liquid surrounding the bag and separated by the bag from the gaseous cushion, a heater element mounted in said body of liquid, means to energize and deenergize said heater element, and means responsive to predetermined relative movement of said members to operate said energizing means to cause the heater element to vary the temperature of the gaseous cushion, and thereby to cause a change in the resilient resistance of the gaseous cushion under load.

7. A vehicle suspension system, comprising means forming a closed, sealed space having a variable range of volume, a pair of members between which variable loads are to be transmitted, said members being relatively movable to vary the volume of said space-forming means, a cushion of gaseous material confined in said space, said space-forming means comprising a flexible bag which encloses the gaseous cushion to prevent its escape where said members are relatively movable, and also comprising a body of liquid surrounding the bag and separated by the bag from the gaseous cushion, a heater element mounted in said body of liquid, a partition extending between the bag and heater element to prevent contact of the bag with the heater element, means to energize and deenergize said heater element, and means responsive to predetermined relative movement of said members to operate said energizing means to cause the heater element to vary the temperature of the gaseous cushion, and thereby to cause a change in the resilient resistance of the gaseous cushion under load.

8. A vehicle suspension system, comprising means forming a closed, sealed space having a variable range of volume, a pair of members between which variable loads are to be transmitted, said members being relatively movable to vary the volume of said space-forming means, a cushion of gaseous material confined in said space, an electric heater element mounted adjacent said cushion to exchange heat therewith, an electric circuit connected to said heater element to vary the temperature of said heater element, and means responsive to predetermined relative movement of said members to cause said electric heater element to vary the temperature of the gaseous cushion, and thereby to cause a change in the resilient resistance of the gaseous cushion under load, said last-mentioned means comprising a switch operable by movement of said members toward each other beyond predetermined limit to close said circuit to energize the electric heater element.

References Cited in the file of this patent

UNITED STATES PATENTS

| | | |
|---|---|---|
| 1,350,414 | Langdon | Aug. 24, 1920 |
| 2,021,043 | Bedford et al. | Nov. 12, 1935 |
| 2,352,351 | Thornhill | June 27, 1944 |
| 2,396,318 | De Bell | Mar. 12, 1946 |

FOREIGN PATENTS

| | | |
|---|---|---|
| 11,726 | Great Britain | 1894 |